United States Patent [19]

Cosenza

[11] Patent Number: 5,033,924
[45] Date of Patent: Jul. 23, 1991

[54] LOCK NUT HAVING A DEFORMABLEL THREADED BORE

[75] Inventor: Frank J. Cosenza, Santa Barbara, Calif.

[73] Assignee: VSI Corporation, Torrance, Calif.

[21] Appl. No.: 448,875

[22] Filed: Dec. 12, 1989

[51] Int. Cl.$^5$ ............................................. F16B 39/22
[52] U.S. Cl. ..................................... 411/282; 411/277
[58] Field of Search .............................. 411/282–284, 411/276, 277, 925, 937.2, 937, 966, 967, 972

[56] References Cited

U.S. PATENT DOCUMENTS

| | | | |
|---|---|---|---|
| 1,966,613 | 7/1934 | Cole | 411/277 |
| 2,370,352 | 2/1945 | Hosking . | |
| 2,400,072 | 5/1946 | Burke | 411/937 X |
| 2,490,728 | 12/1949 | Cox | 411/277 |
| 2,923,339 | 2/1960 | Skidmore | 411/277 |
| 3,013,598 | 12/1961 | Marcy | 411/277 |
| 3,171,459 | 3/1965 | Storch . | |
| 3,340,920 | 9/1967 | Johnson . | |
| 3,412,772 | 11/1968 | Meyfarth et al. . | |
| 3,433,280 | 3/1969 | Reusser | 411/282 |
| 3,433,616 | 5/1969 | Dey | 411/282 |
| 3,599,692 | 8/1971 | Holmes | 411/282 |
| 4,291,737 | 9/1981 | McMurray et al. . | |

FOREIGN PATENT DOCUMENTS

| | | | |
|---|---|---|---|
| 863687 | 2/1971 | Canada | 411/282 |
| 2496784 | 6/1982 | France | 411/276 |
| 662157 | 12/1951 | United Kingdom | 411/276 |

Primary Examiner—Gary L. Smith
Assistant Examiner—Suzanne L. Dino
Attorney, Agent, or Firm—Pretty Schroeder Brueggemann & Clark

[57] ABSTRACT

An improved lock nut of the kind having a deformable section at one end, with a generally elliptical cross-section. The deformable section has a maximum radial thickness in the region of the ellipse's minor axis, to provide a desired degree of frictional locking when threaded onto a bolt, and it has a minimum radial thickness in the region of the ellipse's major axis, to reduce stresses and plastic deformation that could otherwise adversely affect the lock nut's reusability.

9 Claims, 2 Drawing Sheets

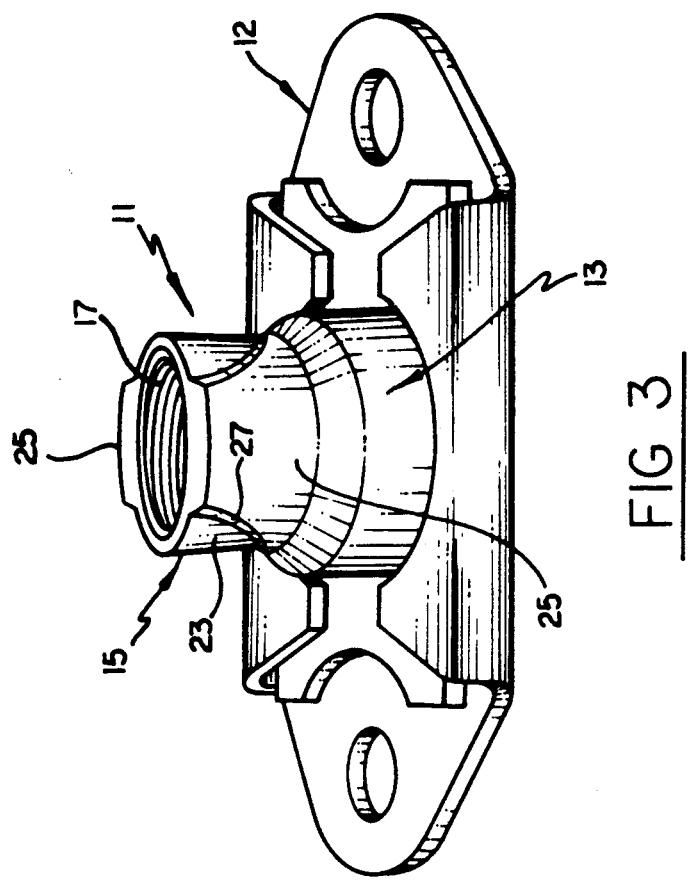
FIG 3
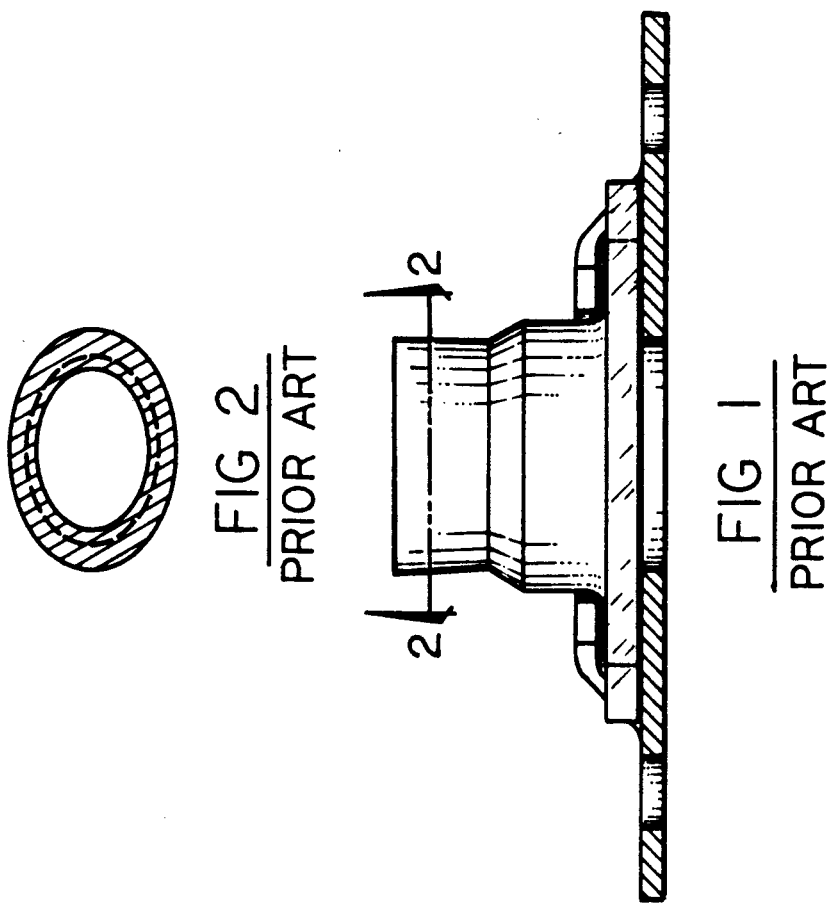
FIG 2
PRIOR ART
FIG 1
PRIOR ART

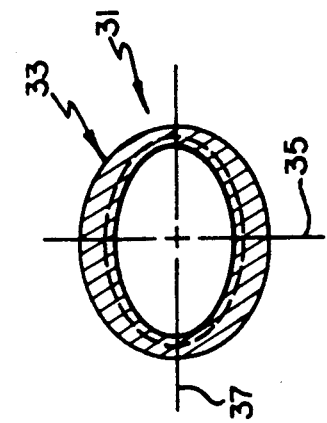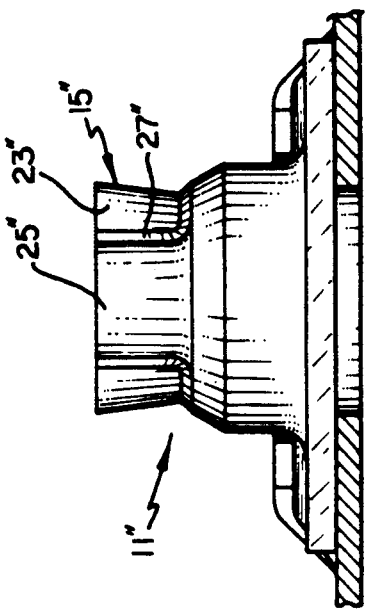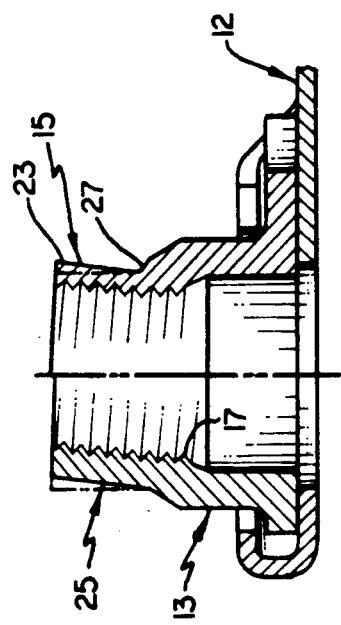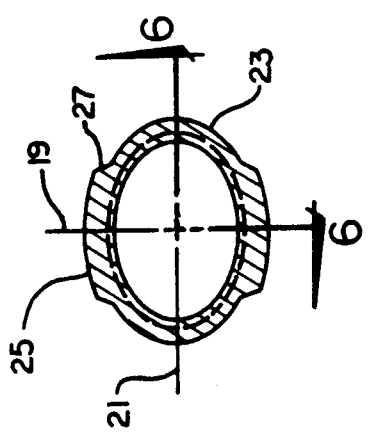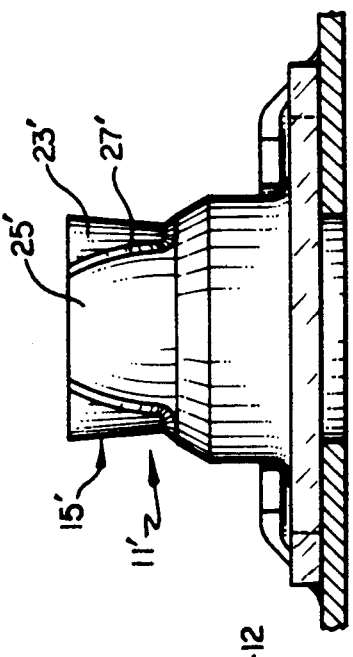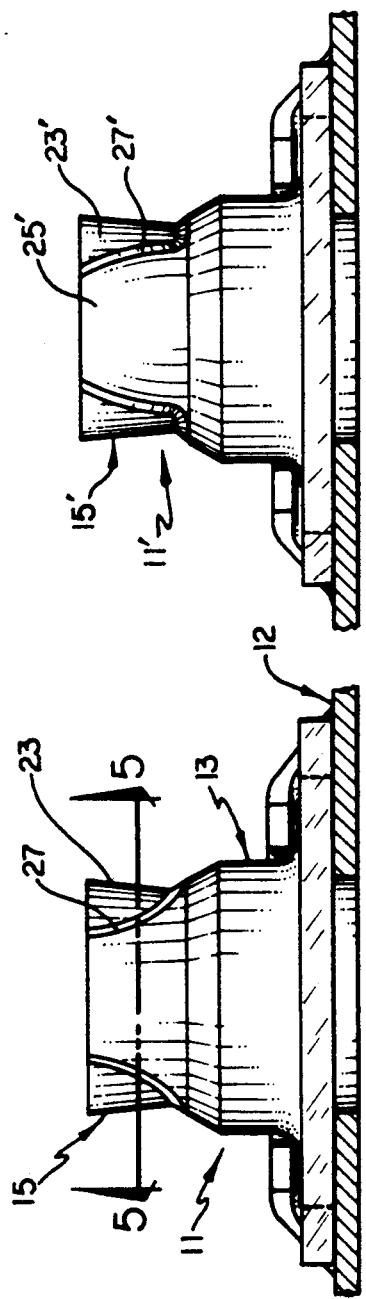

LOCK NUT HAVING A DEFORMABLEL THREADED BORE

BACKGROUND OF THE INVENTION

This invention relates generally to lock nuts of the kind having a deformable elliptically-shaped threaded bore and, more particularly, to lock nuts of this kind that are specially configured to provide a high degree of flexibility with maximum reusability.

As shown in FIGS. 1 and 2 of the drawings, prior lock nuts of this general kind typically include a rigid body section and an integral deformable section projecting from one end of the rigid body section. A threaded bore extends axially through the two sections. The deformable section typically has a uniform radial thickness, with an arcuate periphery, although some lock nuts of this kind have included deformable sections with hexagonal peripheries that are mere extensions of hexagonal rigid body sections.

In manufacturing the prior lock nuts of this kind, two opposed sides of the deformable section are deformed radially inwardly into the threaded bore, such that that portion of the bore has a generally elliptical cross section. The ellipse's major and minor axes are oriented substantially perpendicular to each other. When the lock nut is threaded onto a bolt, the deformable section is deformed back into a generally circular cross section, to frictionally lock the nut in place.

When the lock nut is subsequently unthreaded from the bolt, the deformable section often fails to return fully to its original elliptical shape. This is because of over stressing or plastic deformation, particularly in the area of the ellipse's major axis. In the past, the usual practice has been to over-deform the ellipse and allow the initial threading of the nut onto a bolt to properly size the ellipse. Thereafter, it is hoped that with each repeated use the deformable section will deform only elastically, and not plastically. However, that hope frequently is not realized, and after only a few cycles of usage, the locking torque frequently reduces to an unacceptable level. When that occurs, the lock nut must be discarded and replaced with a new one. In addition, when the lock nut is threaded onto a bolt fabricated to the upper tolerance limits of its thread pitch diameter and thereafter removed and threaded onto a similar bolt fabricated to the lower tolerance limits of its thread pitch diameter, the resulting locking torque is frequently too low.

It should therefore be appreciated that there is a need for a lock nut of the kind having an elliptically-shaped threaded bore that can be repeatedly threaded and unthreaded on a bolt for a greater number of cycles than previously could be achieved, without experiencing an excessive reduction in frictional locking torque. The present invention fulfills this need.

SUMMARY OF THE INVENTION

This invention is embodied in an improved lock nut of the kind having a deformable elliptically-shaped threaded bore that can be reused with multiple male fasteners a significantly greater number of times without experiencing an undue reduction in locking torque. The lock nut includes a body having a threaded bore extending axially through it, with a deformable section at one axial end having an arcuate outer surface. In at least a portion of the deformable section, the threaded bore has a generally elliptical cross section, with a major axis and a minor axis oriented substantially perpendicular to each other. In accordance with the invention, the deformable section's radial thickness is a minimum in alignment with the major axis and a maximum in alignment with the minor axis. Consequently, when the lock nut is threaded onto a bolt of predetermined uniform diameter, the deformable section is mechanically deformed back into its original, substantially circular configuration, to frictionally lock the nut in place. Configuring the deformable section to have a minimal radial thickness in alignment with the ellipse's major axis ensures that bending stresses at those circumferential locations are minimized, thus avoiding plastic deformation that otherwise could adversely affect the lock nut's continued reusability. So configuring the deformable section also provides a more uniform degree of locking friction for the entire tolerance range for the bolt's thread pitch diameter.

In several embodiments of the invention, the deformable section includes an inner portion having a substantially uniform radial thickness and uniform axial length and an integral outer portion having a substantially uniform radial thickness and an axial length that varies with circumferential location. The outer portion's axial length is a maximum in alignment with the ellipse's minor axis and a minimum in alignment with the ellipse's major axis. A ledge is thereby defined at the end of the deformable section's outer portion. Preferably, the outer portion's maximum length is the same as that of the inner portion and its minimum length is substantially zero. The inner and outer portions can have substantially the same radial thicknesses.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 1 is a side view of a prior art lock nut having an elliptically-shaped deformable section projecting from one end.

FIG. 2 is a sectional view of the lock nut of FIG. 1, taken substantially taken in the direction of the arrows 2—2 in FIG. 1, showing the deformable section to have a substantially uniform radial thickness around its entire circumference.

FIG. 3 is a perspective view of a first embodiment of a lock nut in accordance with the invention, having a elliptically-shaped deformable section at one end with a non-uniform radial thickness around its circumference.

FIG. 4 is a front elevational view of the lock nut of FIG. 3.

FIG. 5 is a sectional view of the lock nut of FIGS. 3 and 4, taken substantially in the direction of the arrows 5—5 in FIG .4.

FIG. 6 is a sectional view of the lock nut of FIGS. 3-5, taken substantially in the direction of the arrows 6—6 in FIG. 5, with half of the sectional view representing the lock nut's minor axis portion and the other half representing its major axis portion.

FIG. 7 is a front elevational view of a second embodiment of a lock nut in accordance with the invention.

FIG. 8 is a front elevational view of a third embodiment of a lock nut in accordance with the invention.

FIG. 9 is a sectional view similar to FIG. 5, but of a fourth embodiment of a lock nut in accordance with the invention.

DESCRIPTION OF THE PREFERRED EMBODIMENTS

With reference now to the drawings, and particularly to FIGS. 3-6, there is shown a floating lock nut 11 carried loosely within a cage 12. The lock nut includes a rigid section 13 and integral deformable section 15, with a threaded bore 17 extending axially through the two sections. The deformable section has an arcuate periphery, while the rigid section can be of any conventional design, such as the depicted plate nut. When the lock nut is initially manufactured, the threaded bore is substantially circular along its entire length and the outer periphery of the deformable section includes substantially circular arcs concentric with the bore. The deformable section is then manually deformed by squeezing two of its opposed sides radially inwardly. This changes the portion of the threaded bore within the deformable section into a generally elliptical shape. The ellipse's minor axis 19 is aligned with the direction of squeezing, while the major axis 21 is perpendicular to it. Since the circumference of the threaded bore remains generally the same after the deformable section has been deformed, the ellipse's major diameter is larger than was the circular bore's diameter.

In use, the lock nut 11 is threaded onto a threaded male fastener or bolt (not shown) having a predetermined diameter matched to that of the portion of the threaded bore 17 extending through the lock nut's rigid section 13. The lock nut threads freely onto the bolt until the bolt's leading threads reach the deformable section 15. Continued threading causes the deformable section to deform back substantially into its original circular shape, with the resulting friction between the mating threads serving to lock the nut in place.

When the lock nut 11 is subsequently unthreaded from the bolt, by applying a torque sufficient to overcome the friction between the engaged threads, the deformable section 15 is free to return to its original elliptical shape. In the past, lock nuts of this kind have not generally been configured in a way that allows their deformable sections to return fully to their original shapes. This is because certain portions of the deformable sections of these prior lock nuts, i.e., portions aligned with the ellipse's major axis, undergo plastic deformation when threaded onto a bolt. Stresses concentrate at these major axis portions, because of the relatively small radius into which these portions are deformed. Reusing the lock nut on the same or a different bolt therefore results in a diminished degree of frictional locking.

In accordance with the invention, the lock nut 11 of FIGS. 3-6 is configured to reduce substantially the concentration of stresses at the portions of the deformable section 15 aligned with the major axis 21. In particular, the deformable section is configured to have a reduced radial thickness in those portions, as compared with portions aligned with the minor axis 19. This minimizes the concentration of stress at the major axis portions and, thereby, allows a greater range of elastic deflection by the minor axis portions. Consequently, the nut can be reused with successive bolts a much greater number of times and can satisfactorily lock onto the bolts having a wider range of pitch diameters, including bolts whose threads are significantly worn.

More particularly, and with reference to FIGS. 3-5, it will observed that the deformable section 15 includes an inner portion 23 having a uniform radial thickness and uniform axial length and further includes an integral outer portion 25 having a uniform radial thickness and an axial length that varies from a minimum of zero to a maximum that is the same as the inner portion. The transitions between the minimum and maximum lengths are gradual, such that each transition defines a narrow, arcuate ledge 27 at the outer portion's axial extent. The radial thicknesses of the inner and outer portions are substantially equal to each other.

This configuration for the lock nut's deformable section 15 allows the amount of frictional hold and the extent of reusability to be specially tailored. In particular, the combined radial thicknesses of the inner and outer portions affects the degree of the nut's frictional hold, while the radial thickness of the inner portion by itself affects the nut's reusability.

FIG. 6 is cross-sectional view of the lock nut 11, with the left side of the figure depicting the minor axis cross-section and the right side depicting the major axis cross-section. The solid lines depict the nut in its unstressed condition, with the deformable section 15 having an elliptical cross-section, while the dotted lines depict the nut in its stressed condition, threaded onto a bolt.

FIGS. 7 and 8 depict two further embodiments of lock nuts 11' and 11" in accordance with the invention. Each embodiment is similar to the embodiment of FIGS. 3-6 in that its deformable section 15' and 15" includes integral inner and outer portions 23' and 25' or 23" and 25", with the outer portion being located only in the region of the ellipse's minor axis. The ledge 27' of the FIG. 7 embodiment has a convex curvature, as contrasted with the concave curvature of the ledge 27 of the FIG. 3 embodiment. In the FIG. 8 embodiment, the outer portion has parallel side walls 27" such that it extends circumferentially a constant amount along its entire axial length.

FIG. 9 depicts a fourth embodiment of a lock nut 31 in accordance with the invention. In this embodiment, the lock nut's deformable section 33 has a radial thickness that varies continuously from a maximum in alignment with the ellipse's minor axis 35 to a minimum at the ellipse's major axis 37. The reduced radial thickness in the region of the deformable section's major axis, where the threaded bore's radius is a minimum, substantially reduces the mechanical stresses that lead to plastic deformation and reduced reusability. In addition, the ratio of radial thicknesses of the minor diameter and major diameter portions can readily be tailored to provide the desired degree of frictional locking and reusability.

It should be appreciated from the foregoing description that the present invention provides an improved lock nut of the kind having a deformable section at one end, with a generally elliptical cross-section. The deformable section has a maximum radial thickness in the region of the ellipse's minor axis, to provide a desired degree of frictional locking when threaded onto a bolt, and it has a minimum radial thickness in the region of the ellipse's major axis, to reduce stresses and plastic deformation that could otherwise adversely affect the lock nut's reusability.

Although the invention has been described in detail with reference only to the presently preferred embodiments, those of ordinary skill in the art will appreciate that various modifications can be made without departing from the invention. Accordingly, the invention is defined only by the following claims.

I claim:

1. A lock nut comprising:
    a body having a threaded bore extending axially through it;
    wherein the body includes at one axial end a deformable section having an arcuate outer surface, the deformable section including an inner portion having a substantially uniform radial thickness and a substantially uniform axial length, and an outer portion integral with the inner portion and having a substantially uniform radial thickness and an axial length that varies circumferentially;
    wherein the threaded bore has a generally elliptical cross-section in at least a portion of the deformable section, with a major axis and a minor axis oriented substantially perpendicular to each other;
    wherein the radial thickness of the deformable section, between the threaded bore and the arcuate outer surface, is a minimum in alignment with the major axis and a maximum in alignment with the minor axis;
    and wherein, when the lock nut is threaded onto a bolt of predetermined uniform diameter, the deformable section is mechanically deformed to change the cross-section of the threaded bore to be generally circular, thereby frictionally locking the lock nut in place.

2. A lock nut as defined in claim 1, wherein:
    the axial length of the outer portion of the body's deformable section varies continuously from a minimum aligned with the major axis to a maximum aligned with the minor axis; and
    a ledge is defined at the end of the outer portion of the body's deformable section.

3. A lock nut as defined in claim 2, wherein the axial length of the outer portion of the body's deformable section is substantially zero in alignment with the major axis and is substantially the same as the uniform axial length of the deformable section's inner portion in alignment with the minor axis.

4. A lock nut as defined in claim 2, wherein the axial length of the deformable section's outer portion is substantially the same as the uniform axial length of the deformable section's inner portion over a circumferential extent of about 40 degrees in each direction from the minor axis.

5. A lock nut as defined in claim 1, wherein the radial thicknesses of the inner and outer portions of the body's deformable section are substantially equal to each other.

6. A lock nut as defined in claim 1, wherein:
    the body further includes a substantially rigid section; and
    the deformable section is integral with, and projects from one end of, the rigid section.

7. A lock nut comprising:
    a body having a rigid section and an integral deformable section, with a threaded bore extending through the two sections;
    wherein the threaded bore has a substantially circular cross-section in the rigid section and a generally elliptical cross-section in at least a portion of the deformable section, with a major axis and a minor axis oriented substantially perpendicular to each other;
    wherein, the deformable section includes
        an inner portion having a substantially uniform radial thickness and a substantially uniform axial length, and
        an outer portion integral with the inner portion and having a substantially uniform radial thickness and an axial length that varies continuously from a minimum aligned with the major axis of the elliptically-shaped threaded bore to a maximum aligned with the minor axis of the elliptically-shaped threaded bore, such that a ledge is defined at the end of the outer portion;
    and wherein, when the lock nut is threaded onto a bolt of predetermined uniform diameter, the deformable section is mechanically deformed to change the cross-section of the threaded bore's to be generally circular, thereby frictionally locking the lock nut in place.

8. A lock nut comprising:
    a body having a threaded bore extending axially through it;
    wherein the body includes at one axial end a deformable section having an arcuate outer surface substantially parallel to the threaded bore's axis;
    wherein the threaded bore has a uniform thread depth and a generally elliptical cross-section in at least a portion of the deformable section, with a major axis and a minor axis oriented substantially perpendicular to each other;
    wherein the radial thickness of the deformable section between the threaded bore and the arcuate outer surface varies substantially uniformly from a minimum in alignment with the major axis to a maximum in alignment with the minor axis;
    and wherein, when the lock nut is threaded onto a bolt of predetermined uniform diameter, the deformable section is mechanically deformed to change the cross-section of the threaded bore to be generally circular, thereby frictionally locking the lock nut in place.

9. A lock nut as defined in claim 8, wherein:
    the body further includes a substantially rigid section; and,
    the deformable section is integral with, and projects from one end of, the rigid section.

* * * * *